UNITED STATES PATENT OFFICE.

WILLIAM F. DOWNS, OF JERSEY CITY, NEW JERSEY.

FERTILIZER AND PROCESS OF MAKING THE SAME.

1,120,917. Specification of Letters Patent. Patented Dec. 15, 1914.

No Drawing. Application filed November 13, 1912. Serial No. 731,087.

*To all whom it may concern:*

Be it known that I, WILLIAM F. DOWNS, a citizen of the United States, residing at Jersey City, in the county of Hudson and State of New Jersey, have invented certain new and useful Improvements in Fertilizers and the Process of Making the Same, of which the following is a specification.

This invention relates to processes of making fertilizers and the products of said processes; and it comprises a method of producing a readily available phosphate fertilizer wherein finely divided or comminuted phosphate rock is intimately admixed with an amount of finely divided silica sufficient to correspond chemically to the bases present, and the mixture submitted to a temperature sufficient to cause said silica to enter into reaction with the phosphate rock, but insufficient to cause any substantial sintering or clinkering of the mixture and insufficient to cause any substantial volatilization of $P_2O_5$, the heating at such a temperature being continued until a substantial proportion of the phosphate becomes available; and it also comprises as a new composition of matter a readily available phosphate fertilizer in the form of a finely divided unsintered pulverulent material yielding substantially no free phosphoric acid to water but yielding substantially all, or a major fraction of, its contained $P_2O_5$ to Wagner's standard ammonium citrate solution, such composition chemically being acidic in its nature but not acid to litmus, and also containing silica in amount substantially corresponding to the formula $RO:SiO_2$ wherein RO stands for a base such as lime (CaO); all as more fully hereinafter set forth and as claimed.

In the manufacture of commercial fertilizers today the usual source of the phosphate component is phosphate rock or phosphorite. Phosphoric acid ($P_2O_5$) is absolutely essential to plant life and its presence in fertilizers is therefore necessary. In the form in which phosphoric acid occurs in phosphate rocks it is unavailable, or is only slowly available, to plant life. For use as fertilizers therefore phosphate rock is usually treated chemically in some manner so as to produce compounds of phosphoric acid either soluble in water (soluble phosphoric acid) or compounds which will dissolve in a solution of Wagner's standard citrate of ammonia (available phosphate).

It is the object of the present process to devise a cheap, simple method of producing available phosphate.

While, as stated, plant life is not able readily to make use of the insoluble phosphates of the rock phosphate, it can utilize any form of phosphate soluble in ammonium citrate.

Phosphorite or phosphate rock as it occurs in nature, consists essentially of orthophosphate of lime or tricalcium phosphate ($Ca_3P_2O_8$), mixed with more or less calcium carbonate. Calcium oxid, clay and silica occur frequently as impurities. It is basic in its character. In the United States, it is variously known, according to the location and character of its occurrence, as Florida hard rock, land pebble, South Carolina land rock, Tennessee brown rock, blue rock, etc. It also occurs in some other countries.

The usual practice now employed in rendering such phosphorite soluble and available as plant food is to treat it with sulfuric acid. This method disassociates the lime from the phosphoric acid either wholly or in part, and produces the well known acid phosphates which form the phosphorus yielding value of the usual commercial fertilizers. The treatment with sulfuric acid, however, also results in the formation of toxic sulfates of iron and alumina in the mass, and these are so injurious to plant life that their presence in excess of a very small percentage is considered a bar to the use of any grade of phosphorite which contains enough of the impurities producing them under the condition of manufacture to cause the resultant material to contain any very great quantity of such toxic materials.

In the present invention a different procedure is employed. Instead of producing an acid water-soluble fertilizer by employing strong mineral acids, I resort to the use of silica in a special way. I have discovered that by mingling and intimately admixing very finely ground phosphate rock with equally fine silica, both being best ground to a fineness greater than 100 mesh, or impalpably fine, and heating to a point below that at which sintering or evolution of $P_2O_5$ would take place, that I can produce a material in which the phosphoric acid is available to plants. Although such a material is, chemically considered, acidic in its nature, yet it has no acid effect on the soil. The amount of silica used should be such as will correspond, approximately, with the amount of bases present in the rock; that is, with the total bases reckoning not only the base combined with the phosphoric acid, but also that existing in the calcium carbonate, oxid of iron, alumina, etc. The temperature of such heating should be somewhat above that required for the formation of lime from limestone and somewhat below that employed in sintering cement clinker. No substantial sintering or formation of $P_2O_5$ fumes should be allowed to occur, since in the former event the reactions go further than is desirable to secure the present product, and since in the latter event, there will be a loss of fertilizing value. Generally a temperature around 720 to 750° C. and not in excess of 1100° C. is desirable. The degree of temperature desirable however will vary with the particular mixture used and with its state of comminution. The time of exposure desirable will vary similarly; but speaking generally it may be said that the finer the grinding of the components of the mixture the less will be the time required for the heating operation.

In carrying out my invention, I first reduce the phosphorite rock to a finely divided state by any usual apparatus, such as grinders or pulverizers. I then intimately mix the powder so formed with sufficient silica to satisfy all of the bases present, as described. The silica may be in the form of finely ground quartz or finely ground sand. In the case of some phosphate rock, much or all of the silica required for the operation may be already present. In such case the silica is of course allowed for in calculating the formula requirements. To determine the amount of silica necessary in any particular instance, I first analyze the material to be treated, and ascertain the amount of silica to be added to secure a total amount corresponding to the amount of the lime according to the molecular weights of the lime and silica, namely, as 56 is to 60, with further sufficient silica to satisfy any other basic oxids that may be present, such as iron oxid. Having thus ascertained the ratio of the silica to be added to the ground phosphorite rock, I next mix the ingredients thoroughly and subject the mixture in any convenient form of apparatus to the necessary heat and keep it under the influence of such heat for a sufficient time for the heat to uniformly penetrate the entire mass and for the necessary reactions to take place. A preliminary test may, in any particular instance, be made to determine the most efficient temperature for the kind and quantities of the ingredient. Such tests are familiar to those who are skilled in the art to which the invention relates. After the mass has been sufficiently heated as described, it is cooled and is then, if desired, crushed in any suitable form of apparatus. The resultant powder contains the phosphorus compounds in a form available for plant food, without any toxic elements, and associated with silica which is of advantage for the purpose required. The product may also be compounded to meet agricultural requirements by the addition of salts of potash, or some form of nitrogen or other material desirable for fertilizers.

The mixture of finely divided phosphate and silica may be heated in an ordinary rotary cement kiln in the manner usual in making Portland cement save that the temperatures should not be so high as to cause sintering or clinkering in any substantial degree. The admixture may be fed into the kiln as a fine powder; or it may be previously moistened and agglomerated into lumps or shaped pieces. By moistening and shaping into briquets, these may be burned in any ordinary stationary kiln. The use of special binders such as waterglass, organic bodies, etc., while practicable enough is ordinarily not necessary since moistening usually gives enough bond for the present purposes. The admixed material may be heated in a reverberatory or any other type of furnace. Admixture with coke breeze or other fuel and sintering by a draft current passed through the mixture is ordinarily not desirable since it is difficult to prevent reducing conditions, at least locally, and the temperatures are apt to go too high. Whatever the mode of heating adopted, and many are possible within the purview of my invention, oxidizing conditions should prevail since otherwise phosphorus or phosphids may be formed.

As to the exact chemical nature of the bodies formed by the reaction of the silica and the phosphates in the present process, I am unaware at present. It may be that there are formed silicates and water-insoluble but available phosphates containing a less ratio of base than the orthophosphates; or it may be that some complex silicophosphates are produced. Whatever the nature of the reactions, the process results in the economical production of a high-grade available phosphate free of influences detrimental to the soil.

The product of the present process is an unsintered or, at most, but slightly aggregated powder. It is a fine white to brown powder, not reacting on litmus paper but acidic in character. It is not soluble in water but breaks up in hydrochloric acid with the separation of some gelatinous silica. On treatment with Wagner's standard according to the usual method of determining "available phosphate", it yields substantially all or a major fraction of its $P_2O_5$. If made from rock running about 36 per cent. $P_2O_5$, it will usually average about 20 to 22 per cent. available $P_2O_5$. An analysis it gives silica in a ratio to the bases present of approximately $RO:SiO_2$.

What I claim is:

1. The process of rendering natural phosphates available as plant food which consists in mixing with finely divided phosphate rock, an amount of finely divided silica at least substantially sufficient to satisfy all of the bases present as mono-basic silicates and subjecting the mixture to the action of heat below that at which the evolution of $P_2O_5$ can occur but sufficiently high to cause said silica to enter into reaction with the phosphate rock.

2. The process of rendering natural phosphates available as plant food which consists in mixing with finely divided phosphate rock, an amount of finely divided silica sufficient to abstract a portion of the lime from the rock to form silicate of lime; subjecting the mixture to a temperature of between 720° and 1100° C., whereby the phosphorus originally united with the lime is converted to an available form.

3. The process of producing available phosphate which comprises intimately admixing finely divided phosphate rock with sufficient finely divided silica to give with the bases present substantially a ratio of $RO:SiO_2$, heating to a temperature below that at which substantial sintering, or the evolution of $P_2O_5$ will take place but sufficiently high to cause said silica to enter into reaction with the phosphate rock, and continuing the heating until a substantial proportion of the phosphate becomes available.

4. As a new composition of matter, a phosphate fertilizer comprising finely pulverulent particles containing base and silica in the approximate ratio of $RO:SiO_2$, said particles being insoluble in water, evincing no reaction with litmus paper, being soluble in hydrochloric acid and yielding up all, or a substantial proportion, of the contained phosphate to a neutral solution of citrate of ammonium.

In testimony whereof I affix my signature in presence of two witnesses.

WILLIAM F. DOWNS.

Witnesses:
 HELEN V. FITZPATRICK,
 ALAN C. McDONNELL.